DRIVE SYSTEM FOR TAPE TRANSPORT SYSTEM

Filed March 22, 1963 4 Sheets-Sheet 1

INVENTOR.
ROBERT A. KLEIST

BY Robert G. Clay

ATTORNEY

INVENTOR.
ROBERT A. KLEIST
BY Robert G. Clay
ATTORNEY

INVENTOR.
ROBERT A. KLEIST
BY Robert G. Clay
ATTORNEY

INVENTOR.
ROBERT A. KLEIST
BY Robert G. Clay
ATTORNEY

United States Patent Office 3,185,364
Patented May 25, 1965

3,185,364

DRIVE SYSTEM FOR TAPE TRANSPORT SYSTEM

Robert A. Kleist, Woodland Hills, Calif., assignor to Ampex Corporation, Redwood City, Calif., a corporation of California Filed Mar. 22, 1963, Ser. No. 267,175
29 Claims. (Cl. 226—24)

This invention relates to tape transport systems, and particularly to simple and economical systems for providing precisely controlled intermittent and bidirectional operation of a tape or web material.

It is necessary for many applications to drive a tape or web material in a controlled fashion through an arbitrary sequence of movements. In addition to high speed but precise start-stop characteristics, such systems must usually maintain the speed of the tape or web member at a selected nominal velocity until the next stop command. A good example of requirements which must be met is provided by magnetic tape transport mechanisms, particularly those used for digital applications, because such systems must cooperate on demand with data processing systems and must accordingly operate at high speeds, but with precision in all respects. Like requirements are found in a number of other tape or web driving systems, however, and the invention should be considered to be applicable to all of such systems.

In order to provide maximum data transfer compatibility for use with data processing systems, magnetic tape transports are usually constructed with a pair of contra-rotating drive capstans, against either of which the tape may be forcibly engaged by an associated pinch roller mechanism which can be actuated or disengaged very rapidly. Such mechanisms have a brief but significant dead time until the pinch roller makes contact, or is released, and the tape is then subjected to a very high tension impulse in being brought up to speed or stopped. The total time interval involved in starting or stopping is of the order of a few milliseconds, which is a relatively large interval for high speed computers even though it is a very short interval for most mechanical systems. Start and stop distances are also of importance, because inter-record gaps must be provided which are adequate for all operating conditions apt to be encountered. Thus, the inter-record gaps must be sufficient to account for slippage due to the accumulation of oxide material on the contacting elements, or due to wear or slight misalignment of elements contacting the tape, or changes due to the program of tape movements. The inter-record gaps must be increased in order to account for all these likely variations, and the density with which the data is recorded on a given length of tape is thereby decreased, even though the bit per inch density remains the same.

Systems using contra-rotating capstans and pinch rollers, together with tape loop buffer mechanisms such as multiple loop tension arms or vacuum chambers are complex and expensive. While they are capable of providing high performance they are not, as noted above, predictable in their characteristics. The same is true of other systems utilizing other drive capstan arrangements, such as one known system in which a single drive capstan is used. In this system, the capstan may be driven in either direction from contra-rotating flywheels, either of which may be engaged by an associated magnetically movable drive shaft and roller. This system, however, is subject to the same deficiencies as the dual capstan mechanism, in that it requires high impact and high frictional forces and therefore suffers from the same irregularities in starting and stopping characteristics due to wear and dynamic effects. All systems using high impact forces are apt to introduce spurious torsional oscillations and speed variations which cannot be compensated for by servo control.

Most data processing systems include some form of discontinuous recording device, such as a punched card or paper tape machine. Magnetic tape systems which operate incrementally (e.g. one frame at a time) have also been developed for this purpose. Those magnetic systems which operate incrementally however, are designed solely for stepping operation and are not readily capable of operating continuously. Further, such systems do not include provision for reproducing data incrementally from a standard format. A machine having a capability for both incremental recording and reproducing can provide many of the input and output functions for which other specialized equipment is now needed.

It is therefore an object of the present invention to provide an improved system for transporting tape or web material bidirectionally, and with controlled start and stop characteristics.

Another object of the present invention is to provide improved driving and control means for digital magnetic tape transports.

A further object of the present invention is to provide an improved tape transport system for intermittent, bidirectional operation, which system is characterized by simplicity, predictability in start-stop characteristics, economy of parts and compactness.

Another object of the present invention is to provide an improved incremental drive system useful in both recording and reproducing data.

Yet another object is to provide a novel recording system for bidirectional operation in either continuous or incremental fashion.

These and other objects of the present invention are achieved by a system providing electrical control of a drive mechanism for starting, stopping and continuous speed operation in either direction. In response to commands representative of the different movements to be imparted to the tape, the system provides shaped start and stop energizing current waveforms to motive means which directly operate a tape drive capstan. These shaped waveforms are utilized only during starting and stopping, servo signals being used during constant speed operation to maintain a selected nominal tape velocity.

A specific example of a system in accordance with the invention includes a motor having substantially linear torque-to-current and a high ratio of torque-to-armature inertia characteristic and directly coupled to a drive capstan which is in constant engagement with a magnetic tape held in a low friction, uniform tension system. The tension of the tape is maintained sufficiently high to avoid slippage relative to the capstan, but still so low that no appreciable axial loading of the capstan and motor occurs. Controlled accelerations and decelerations are imparted to the tape solely by electrical control of the drive motor. The forward and reverse and starting and stopping commands are applied to control circuits which operate both start-stop circuits and associated servo means which derive error signals from the control circuits and a tachometer coupled to the drive motor. During starting, for example, the speed servo may be disabled for a brief interval during which the start-stop circuit provides a controlled current waveform of a desired pulse shape to energize the motor. Thereafter, the start-stop circuit may be disabled and the normal speed servo enabled to maintain the speed substantially constant.

This arrangement operates in integrated fashion with a low friction, uniform tension tape guiding system to provide direct and uniform acceleration and deceleration of the tape, as well as constant speed control. It is found that by the use of electrical signals in this manner acceleration distances and deceleration distances can be selected and held constant, irrespective of system variations and program sequences. Only relatively low power supplies need be used for the start-stop circuits and for the constant speed servo circuits. In accordance with another feature of the present invention, however, motor drive current requirements may be further reduced by utilizing the control means to energize a substantially constant current source for normal speed operation, so that the speed servo need only generate a relatively small control current.

Another feature of the invention is that acceleration and deceleration characteristics may be adjusted to compensate for static or dynamic mechanical characteristics in extremely simple fashion. For example, a part of the acceleration or deceleration interval may be utilized for a special energizing waveform which compensates for starting friction. Control of acceleration and deceleration characteristics in this manner permits the capstan drive to be matched to the characteristics of the tape path at any of a wide range of speeds and start and stop times.

An important aspect of the invention relates to the provision of an incremental drive capability in systems in accordance with the invention. The positive control of acceleration and deceleration is used for predetermined and selectable time intervals by application of energizing pulses of selected waveform, polarity and duration. Thus the tape is advanced by successive increments which are positively and precisely controlled. Data may also be reproduced in incremental fashion by a similar arrangement which however uses the reproduction of a data increment itself to terminate the incremental movement. By this means, continuous and incremental modes of operation may be provided by the same system in simple and economical fashion.

Other features of systems in accordance with the present invention relate to the use of interlocking means which prevent acceptance of improperly spaced commands, and the addition of separate braking means for holding the drive system stationary in a positive fashion.

A better understanding of the invention may be had by reference to the following description, taken in conjunction with the accompanying drawings, in which.

Figure 1:
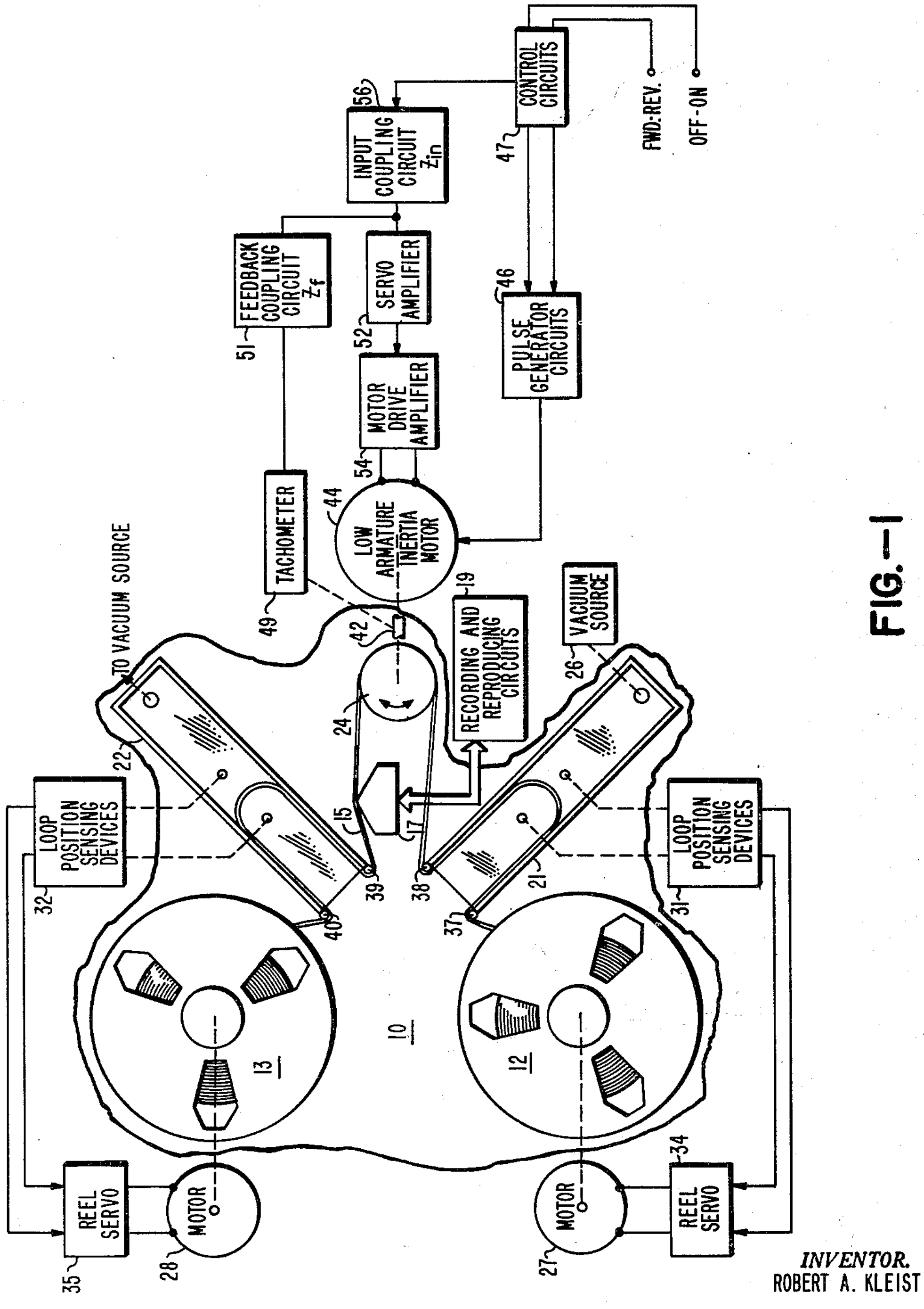
FIG. 1 is a combined simplified elevation and block diagram representation of one form of system in accordance with the present invention.

A system for providing precise control of the movement of a magnetic tape by electrical means alone is shown in FIG. 1. The specific example is concerned with a magnetic tape transport for digital applications, although it will be understood that the principles employed may be utilized in other contexts as well. Only parts of the transport mechanism and the associated servo systems have been shown, in order to simplify the representation.

The mechanical elements are mounted on a front panel 10, and include a tape supply reel 12 and a tape take-up reel 13 designated as "supply" and "take-up" solely for convenience, between which reels the tape 15 is moved bidirectionally in a low friction, uniform tension path. The tape 15 is to be driven in a forward or reverse direction past a magnetic head assembly 17 which is coupled to the recording and reproducing circuits 19, these being connected with an associated data processing system (not shown). The data processing system or some other means provides forward-reverse, and off-on signals for controlling the tape transport mechanism. Inasmuch as the transfer of data and the provision of these control signals may be achieved by conventional means, no further explanation is provided here.

The tape supply and take-up reels 12 and 13, a pair of vacuum chambers 21 and 22, and a centrally disposed single drive capstan 24 are mounted symmetrically in a compact configuration. Each of the vacuum chambers 21 and 22 is positioned between the capstan 24 and a respective one of the reels 12 or 13, and each includes a vacuum port coupled to a vacuum source 26, so that the tape may be drawn into the chamber to form a loop of variable length therein, the loop constituting a buffer or compliance mechanism. The capstan 24, preferably of a low inertia design, may be driven in a high speed sequence of forward and reverse motions, but the relatively slower-acting reel need not have similar speed, because the buffer effectively absorbs the relatively fast changes in motion of the tape. In order to maintain the tape loops within selected limits in the chambers, each of the reels 12 and 13 is driven by an associated motor 27 or 28 which is coupled in a servo loop deriving signals from a pair of position sensing holes in the sides of the chambers. Pressure switches coupled to each of the sensing holes provide loop position sensing devices 31 and 32 which supply error signals to the reel servo 34 or 35 respectively which controls the reel motor 27 or 28 so that the reel 12 or 13 respectively is turned appropriately to withdraw tape from or supply tape to the chamber during operation. Conventional modifications of this system, such as the use of other forms of loop sensing and servo systems, are well understood by those skilled in the art.

This tape transport system, however, is materially different from the systems heretofore used, inasmuch as there are no high tension or high friction or high impact forces on the tape. The system is provided with low friction guides 37, 38, 39 and 40 at the entry and exit ends of the chambers 21 and 22, and the tension on the tape 15 in the region of the head assembly is maintained at a relatively low value, such as 0.2 pound. The tensions introduced by the two chambers are arranged to be substantially alike during operation, so that a low tension difference exists across the head. It is preferred to employ a highly frictional, slightly resilient drive capstan 24, such as one having a rubber or rubber-like surface.

The absence of tape path friction with this system, together with the presence of low inertia and balanced compliance mechanisms, insures that the tape 15 is driven solely by the action of the capstan 24, because the tension on the tape 15 is maintained in excess of that level needed to prevent slipping of the tape relative to the capstan, and also adequate to withdraw tape from the capstan during acceleration. The tension is at a sufficiently low level, however, to preclude the introduction of mechanical loading forces into the capstan drive system. Only very low inertia and mechanical forces need be overcome in turning the capstan 24 and therefore moving the tape 15.

Details of a specific example of circuits described below are described in an application of Martyn A. Lewis entitled "Motor Drive Circuits," Ser. No. 267,166, assigned to the assignee of the present invention and also filed concurrently herewith.

This facility for direct control of tape movement is utilized in a cooperative relationship with electronic means for generating signals for control of the starting, stopping and nominal speed characteristics of tape movement. The capstan is directly coupled by a motor shaft 42 to a low armature inertia motor 44, such as the D.C. type of motor having a planar rotor and windings disposed as printed circuit conductors thereon. This type of motor is preferred for this application, because it not only has low armature inertia, but also has a substantially linear torque versus current characteristic over a relatively wide range. Thus, when coupled to a mechanical system having a very low frictional force and a very low inertia, the applied current may actively and completely control the operation of the mechanical system.

A feature of the present invention is the employment of separate pulse generating circuits 46 coupled directly to the motor 44 for providing not only the energy needed for starting and stopping the tape 15, but also for providing selected current waveforms to impart desired acceleration and deceleration characteristics to the system. The forward-reverse and off-on signals are applied from the data processing system to control circuits which generate firing signals for associated pulse generator circuits 46 which are coupled to control the motor 44 directly. The pulse generator circuits 46 may provide a pulse of one polarity to start the motor 44 in the forward direction and to stop it when operated in the reverse direction, and a pulse of the opposite polarity to start the motor 44 in the reverse direction and to stop it after rotation in the forward direction. The pulse generators are active only during the start and stop periods and are not effective during normal running.

The motor 44 is also operated by a servo mechanism which is controlled in normal operation by error signals generated by comparison of a reference signal to a speed signal derived from a tachometer 49 coupled to the motor shaft 42. An impedance $Z_f$ of the feedback coupling is represented in generalized form by a feedback coupling circuit 51 which is coupled to the input of the servo amplifier 52 which is connected to a motor drive amplifier 54 controlling the motor 44. A separate input or reference signal, represented in generalized form as an input impedance $Z_{in}$, is provided by an input coupling circuit 56 which is operated by the control circuits 47. The input coupling circuit 56 may comprise, for example, bistable circuit and linear circuit elements which are operated to provide actuating and speed reference signals in response to signal patterns existing at the control circuits 47. By appropriate selection of the input impedances or voltage level for the "on" and "off" states and the forward and reverse directions, the servo system is appropriately enabled or disabled, depending upon the operating mode of the system. Specifically, the speed servo may be disabled during the start and stop intervals in order that the selected energizing current waveforms may solely control the acceleration and deceleration characteristics of the system. When the servo is on, it alone functions to maintain the speed of the motor 44 and the tape 15 proportional to a forward or reverse reference signal. when the servo is off, the system is either awaiting a command or the start-stop circuits are controlling.

This arrangement provides a great deal of facility in the achievement of given specific system characteristics, and also provides improved start and stop characteristics. The indeterminate amount of wear and frictional slippage encountered in clutch and other impact-type drive mechanisms is completely avoided. Instead, a current waveform controlled in shape, energy and duration is solely determinative of the acceleration and deceleration characteristics of the system. The large pulse needed for starting and stopping is provided by separate circuits, so that the drive amplifier 54 need only be sufficient in size to maintain the system at a selected nominal velocity by supplying sufficient current to overcome losses and motor and system friction. The size of the power supply needed for the separate pulse generating circuit may, in fact, be very small itself if sufficient time is available between commands to allow recharging of the pulse generating circuits from a small power supply. In any event, the use of identically defined start and stop pulses enables the system to provide identically defined start and stop times, plus controlled and predictable start and stop distances. Because the entire start-stop interval is effectively utilized for accelerating or decelerating the capstan, and because there is positive control of acceleration and speed, the system can thus operate with standard inter-record gaps and rapidly bring a tape 15 to a selected nominal velocity with acceptable instantaneous speed variation, even though it is exceptionally simple and economical.

Figure 2:
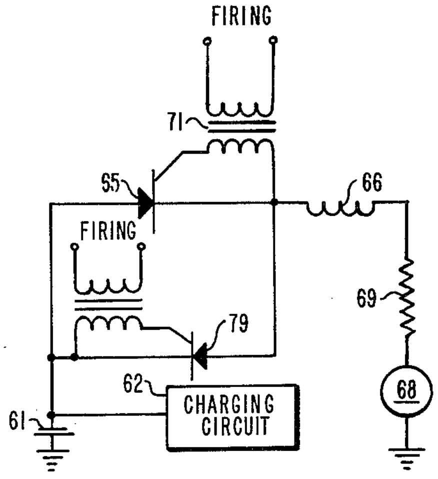
FIG. 2 is a schematic circuit diagram of one form of start pulse generating circuit in accordance with the invention.

A particularly simple circuit for providing controlled acceleration and deceleration characteristics for employment in the pulse generator circuits 46 of FIG. 1 is illustrated in schematic form in FIG. 2. Here, a storage capacitor 61 coupled to a charging circuit 62 constitutes a low voltage power supply which is connected in series with a silicon-controlled rectifier (or SCR) 65, and an inductive element 66 which represents in generalized form the motor inductance as well as an inductance external to the motor. These elements are coupled to the armature windings of the printed circuit motor 68, the resistance equivalent of which is shown as a resistor element 69. The firing signal is derived from the external control circuits (FIG. 1) through a transformer 71 coupled to the control electrode of the silicon-controlled rectifier 65. Firing of the rectifier 65 causes discharge of the positively charged capacitor 61 through the inductive element 66 to the motor. Only during the initial discharge interval is current supplied to the motor 68. After the single polarity half of the sine wave power pulse, the unilateral action of the silicon-controlled rectifier 65 or 79 blocks passage of the opposite-going half of the sine wave signal. It may be noted that the SCR switches at zero current in each case and that the inductance 66 is left with no stored energy. A parallel SCR 79 is similarly fired to give conduction from the capacitor 61 when it is negatively charged.

This discharge interval gives the following current and torque relationships:

$$i(t)=\frac{E_0}{\sqrt{\frac{L}{C}}}\left(e^{\frac{-2\frac{t}{L}}{R}}\right)\sin\sqrt{\frac{1}{LC}-\frac{R^2}{4L^2}}\,t$$

$$\text{Torque}=K_{\text{motor}}i(t)$$

$$\omega(t)=\text{capstan velocity}=\int_0^t \frac{K_{\text{motor}}}{\text{Inertia}}i(t)\,dt$$

$$d(t)=\text{distance}=\int_0^t \omega(t)\,dt$$

Figure 3:
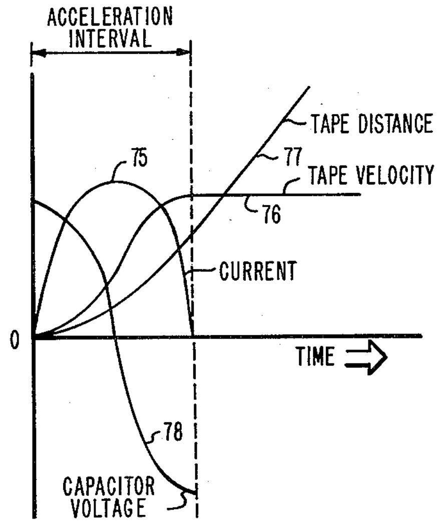
FIG. 3 is a graph showing variations with time of certain characteristics in the operation of the system of FIG. 1 utilizing the start pulse circuit of FIG. 2.

These relationships are shown graphically in FIG. 3, in which the curve 75 illustrates the half sine wave current pulse, and the curve 76 illustrates the change of speed characteristics. The change of tape distance with time is therefore represented by the curve 77, and demonstrates that with like current pulses the start distance at the end of the acceleration interval is in each instance uniform. The voltage across the capacitor is shown by curve 78. It will be understood that the circuit of FIG. 2 is particularly economical in charging the capacitor 61 for successive commands in bidirectional operation. The capacitor voltage at the end of discharge is a substantial portion of that needed for the next command, and only dissipative losses need be supplied.

Figure 4:
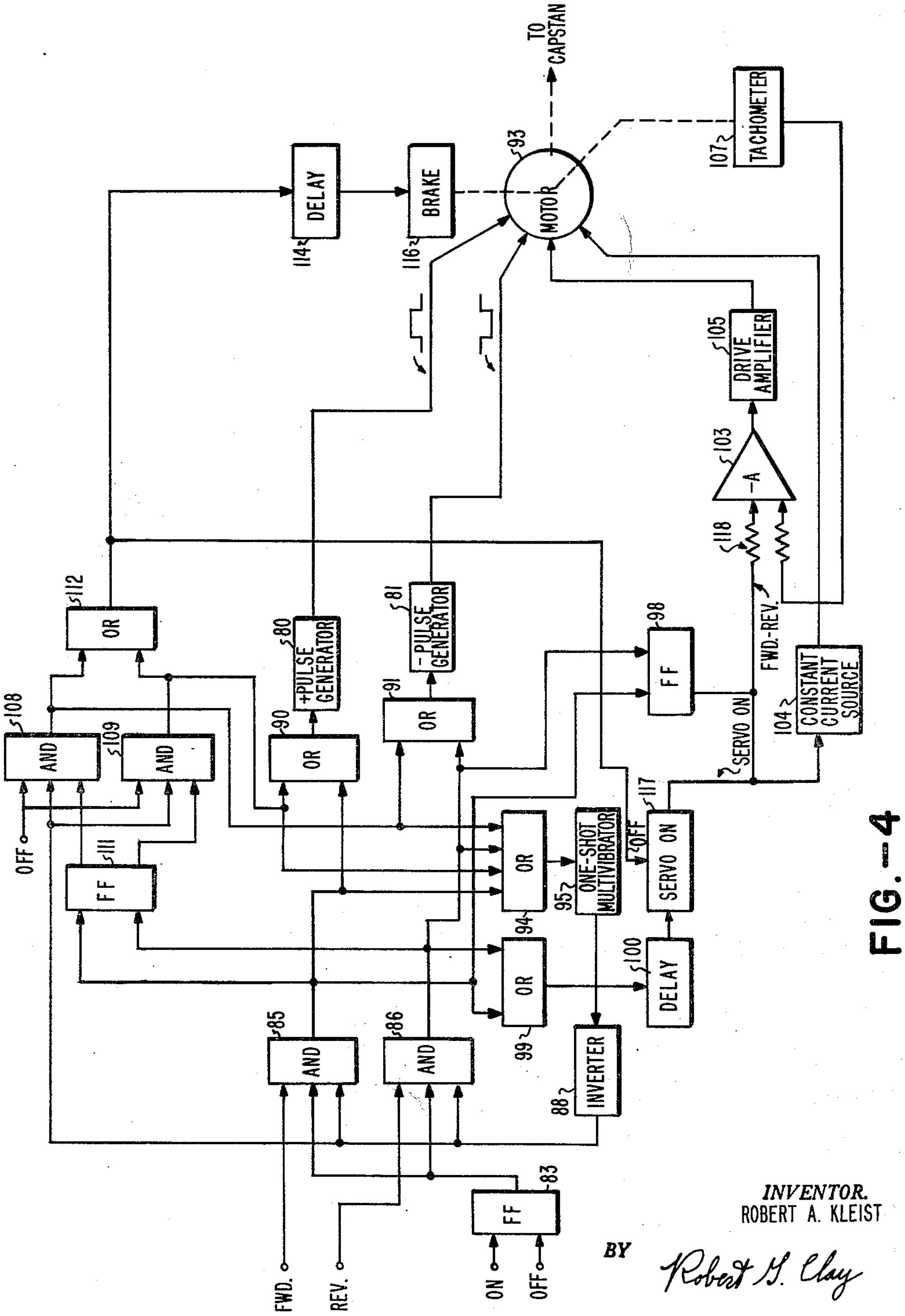
FIG. 4 is a block diagram representation of a different form of capstan drive arrangement in accordance with the invention, showing other features thereof.

Other features of systems in accordance with the invention are shown in FIG. 4, in which input signals for starting and stopping the tape in either of two directions are provided on four separate lines, designated forward, reverse, on and off respectively. Those skilled in the art will recognize that the input commands may be supplied in a wide variety of ways and combinations. This system operates with a pair of separate pulse generator circuits designated the + pulse generator 80 and the − pulse generator 81 respectively, in contrast to the integrated pulse generator of FIG. 2. It also includes an interlock circuit which assures that proper time intervals are observed between successive actuating signals, in order that one phase of a program may be completed before the next is entered into. The "on" signals set a flip-flop 83 to condition a pair of AND gates 85, 86 which receive the separate forward and reverse signals respectively. In the absence of a signal previously applied to cause the interlock circuit to be actuated, these AND gates 85, 86 are conditioned by a signal from an inverter circuit 88 so that either the forward or the reverse signal passes the associated gate 85 or 86 and is applied through a coupled OR circuit 90 or 91 to actuate either the + or − pulse generator 80 or 81 respectively. Thus a start signal for the appropriate direction is applied from either pulse generator 80 or 81 to the motor 93.

The interlock circuit is actuated for a time interval corresponding to the start pulse interval, being energized by pulses derived through the AND gates 85, 86 and an OR circuit 94 supplying a pulse of the selected duration from a one-shot multivibrator 95. If the start and stop intervals are 2 milliseconds, for example, the one-shot multivibrator is adjusted to have an active interval of 2 milliseconds, deactivating the AND gates 85, 86 for this interval.

At the end of a start interval, the regular speed servo for the motor 93 is used for speed control. For this purpose, a flip-flop 98 is set to the proper state by the forward-reverse signal and its output is the appropriate + or − reference signal for the servo. Start pulses are provided through an OR circuit 99, and a delay circuit 100 to a "servo on" circuit 117 to switch the output of flip-flop 98 to the servo input. The delay corresponds to the selected start interval. The output signal from the flip-flop 98 is applied to the input of the servo loop through an input network 118 coupled to the servo amplifier 103 which controls a drive amplifier for the motor. The motor 93 also receives signals from a constant current source 104 which is activated by the "servo on" circuit 117. The speed error signal is derived by summing the output of a tachometer 107 coupled to the servo amplifier 103 through the respective network 102 with the control signal. The greatest proportion of the peak drive power, however, is derived from the constant current source 104.

When the tape is stopped by provision of an "off" pulse a different gating network comes into operation. This includes a pair of AND gates 108, 109 which are controlled by the separate outputs of a flip-flop 111 which is set by the forward start pulses and reset by the reverse start pulses, so that it continuously indicates the proper direction of tape movement when the tape is moving. The AND gates 108, and 109 are also coupled in the interlock circuit in the fashion of the gates 85, 86. Thus, depending upon the direction the tape is moving, an off pulse passes either AND gate 108, 109 and an associated OR circuit 112 a deactivate the "servo on" circuit 117, turning the servo off immediately. Depending upon which AND gate 108, 109 is activated, either the + or − pulse generator 80, 81 is energized, to actuate the motor 93 with a stop pulse of the required polarity. A delay circuit 114 is also coupled to the OR gate 112, this delay circuit 114 providing an adequate delay to control the energization of a brake 116 coupled to the motor 93. Accordingly, after the stop interval, the brake 116 is energized briefly so as to insure that the motor is stopped. The brake may also be employed at some intermediate time in the stop interval, in the event that the deceleration characteristic does not introduce slippage.

Figures 5, 7, 9:
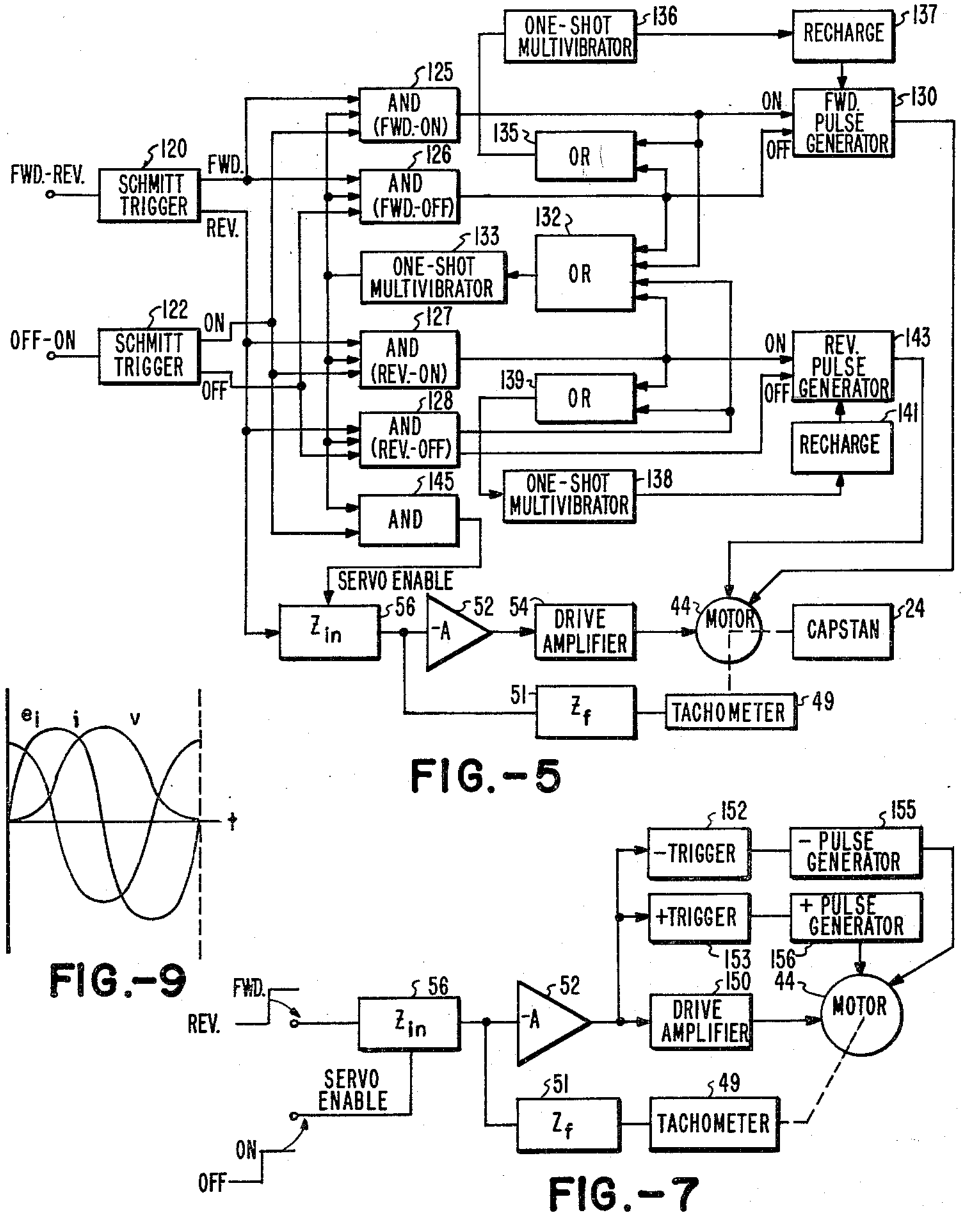
FIG. 5 is a block diagram representation of a capstan drive arrangement in accordance with the invention which utilizes the pulse generator of FIG. 2.
FIG. 7 is a simplified block diagram which illustrates in further detail the incorporation of start-stop circuits into the servo loop.
FIG. 9 is a graph showing the change of certain variables plotted against time, and useful in explaining the operation of the system of FIG. 8.

FIG. 5 illustrates an embodiment of the circuit of FIG. 2 into a system in accordance with this invention. Two input control lines assumed to have a level indication of + for "true" and zero for "false" for this example, are fed into two Schmitt triggers 120, 122, with the "true" indications noted on the outputs in FIG. 5. A group of four AND gates 125, 126, 127 and 128 receives the signals from the triggers 120, 122 and generate signals representative of various combinations of the forward (hereafter Fwd), reverse (hereafter Rev) and on and off states. Considering an example of Fwd-On, the Fwd-On AND gate 125 passes a pulse which triggers a Fwd pulse generator 130 to provide an "On" (here defined as positive current) pulse to accelerate the motor 44 forward. The same pulse goes through a common (to all AND gates 125–128) OR circuit 132 to trigger a one-shot multivibrator 133 which disables all command inputs to the AND gates 125–128 thus inhibiting any new commands until the start or stop transient is complete. The same pulse goes through an OR gate 135 common also to the Fwd-off AND gate 126 and triggers another one-shot multivibrator 136 which disables a recharge circuit 137 for the Fwd pulse generator 130 for the duration of the start period.

The on and off signals from the pair of reverse AND gates 127, 128 separately actuate a different one-shot multivibrator 138 through a separate OR gate 139. This one-shot multivibrator 138 controls a recharge circuit 141 for the coupled reverse pulse generator 143.

The one-shot multivibrator 133 in the interlock circuit also disables an AND gate 145 which normally provides an enabling signal to the input coupling circuit ($Z_{in}$) 56 for the servo when the Schmitt trigger 122 is "on." The reference signal is derived for forward and reverse speed controls of the servo from the two different signal levels which are provided at the "Rev" output terminal of the Schmitt trigger 120.

Referring now to FIG. 3 it may be noted that the capacitor voltage will be negative at the end of the firing interval shown. The recharge circuits 137, 141 are made sensitive to the capacitor voltage by conventional means (such as a Schmitt trigger) which connects the capacitor to a negative supply in this example, but would connect the capacitor to a positive supply when the capacitor voltage is positive (as it would be after the Fwd-Off command) or zero (as it would be when equipment is turned on). Such means may be conventional and accordingly is not shown in detail.

A similar sequence of operation may be traced through for other command sequences. The servo operation is obtained merely by using the input signal from the Fwd-Rev Schmitt trigger 120, the voltage level of each state being the velocity reference signal voltage for the servo, and enabling the servo only when the start transient is over and an "on" command signal is applied. The organization and operation of the servo are similar to what has been described above.

In this arrangement the "On" signal and the interlock signal from the one-shot multivibrator 133 activate the AND gate 145 which enables the servo through the input coupling 56. Because the pulse generator current has typically more than a 10 to 1 ratio to the servo current, it is not essential to disable the servo during the start transient since the contribution of the servo will not be appreciable and will be consistent from one sequence of operation to another, hence the start characteristics will still be predictable. No brake is shown in the FIG. 5 system, although one could be included similarly to the FIG. 4 system. Practical systems in accordance with the invention have not required a brake because the control circuits are successful in bringing the capstan to a stop and motor brush friction is sufficient to prevent "creep" during off periods, while the tape path features equal tape tensions on either side of the capstan. Brush friction will oppose acceleration and aid deceleration.

For some lower acceleration applications where brush friction is an appreciable per cent of acceleration torque, the required deceleration torque can be selected by decreasing the negative charge of the capacitor for the example given above in order to equalize start-stop times and distances.

An advantage of this type of pulse generator is its efficiency in obtaining a controlled current pulse—the only appreciable power losses are in motor and inductor resistances. If, for example, a regulated current is employed, further power losses will be incurred in the regulation means. Realizing that capstan drive power would be a large percent of the total transport power in many digital applications, this could be of value where low power consumption is of importance. A further advantage is the inclusion of motor inductance within the pulse generation circuit.

Figure 6:
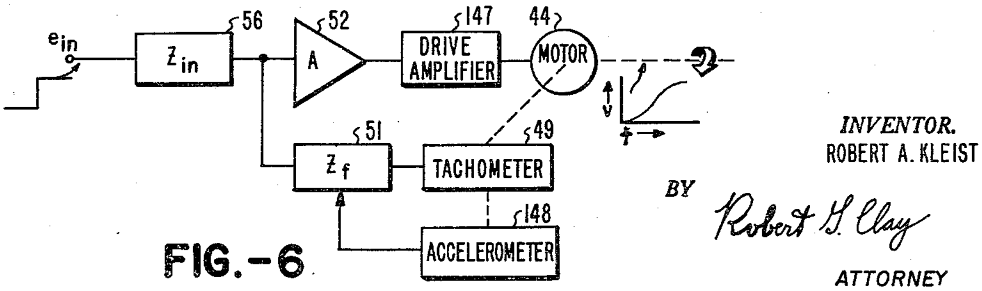
FIG. 6 is a simplified block diagram which illustrates an arrangement in which start and stop circuits are included in the servo loop.

While FIGS. 1, 4, and 5 illustrate examples of separate pulse generator and logic circuits separate from the capstan servo loop, it will be understood by those familiar with such technology that these functions could be integral with the servo loop. FIG. 6 illustrates this general case wherein an input signal following a step function is applied to the servo loop which has a drive amplifier 147 capable of supplying the maximum drive current required during acceleration or deceleration. The generalized impedance functions $Z_{in}$ and $Z_f$ (together with motor constants and other components in the loop) determine the overall system transfer function and thus can be selected to give desired velocity output characteristics for an input step function—one such characteristic is shown adjacent the motor shaft in FIG. 6. The generalized impedances are not necessarily linear; $Z_f$, for example, includes an additional input signal derived from an accelerometer 148 operated from the motor 44 shaft.

FIG. 7 is a further illustration of the incorporation of the start-stop circuits and logic into the servo loop. Here the input command step functions are applied to a servo amplifier 52 which saturates in the absence of feedback from the tachometer 40 on start, for example (the amplifier is provided with conventional means to avoid saturation recovery problems). The signal level at saturation and the polarity are sensed by an appropriate one of two trigger circuits 152, 123, each of which fires an associated pulse generator 155, 156 to start the motor 44. At nominal velocity the servo operates linearly and the amplifier 152 output stays within a more narrow range, insufficient to operate the triggers 152, 153. Similar operations occur for the signal conditions existing under forward-off and reverse commands.

Figure 8:
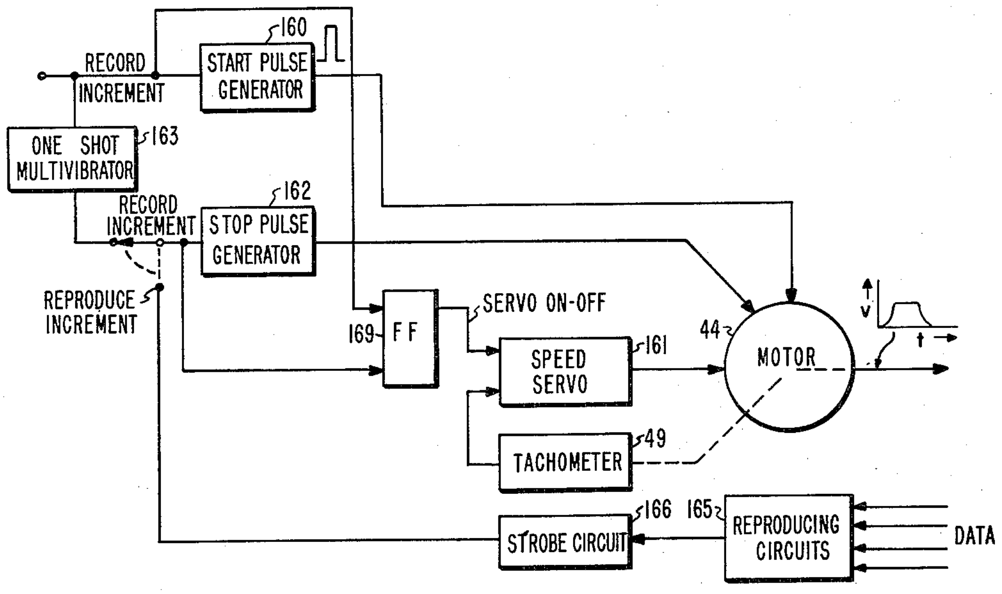
FIG. 8 is a simplified block diagram of yet another form of capstan drive arrangement, showing an incremental drive system for both signal recording and reproduction.

The arrangement of FIG. 8 provides an illustration of an incremental drive tape system utilizing the advantages of systems in accordance with the invention. In this arrangement, the successive steps used during recording are provided by the use of brief actuating start pulses applied to the motor 44, there being one pulse for each increment of movement, derived from a start pulse generator 160. At each step, the motor 44 briefly accelerates until the start pulse terminates, then may be servoed to some nominal velocity and finally decelerates in response to a stop signal derived from a stop pulse generator 162 which is triggered by a one-shot multivibrator 163 providing a predetermined delay after the start pulses. Data may be recorded with the tape stationary, at the initiation or termination of an increment of movement, or when the tape is at speed. Because of the inherent consistency of this system in open loop operation no separate servo system is needed to insure exact control of the incremental distance. The incremental distance may be changed simply by changing the time interval of the delay provided by the one-shot multivibrator 163.

In the reproducing mode, the stepping action is differently controlled. A start pulse from the pulse generator 160 accelerates the tape to the selected speed at which it is maintained, until data pulses are reproduced from the tape for the increment being read. Ordinarily, a data "frame" consists of a multi-bit character, the bits of which are reproduced in parallel by circuits 165, and these are coupled to a strobe circuit 166 to provide a single strobe pulse. The strobe pulse is coupled through a switch 168 to the stop pulse generator 162. The start and stop pulses operate a flip-flop 169 which enables and disables the speed servo 161. Data which is recorded in a standard format, such as 200 or 556 bits per inch, may therefore be read out incrementally. The same system, however, may provide continuous as well as incremental readout.

An alternate and simplified incremental drive arrangement for recording only can be obtained by utilizing a circuit like that of FIG. 2 to drive the motor directly without use of a servo control. In this configuration data is recorded with the tape stationary, and the movement command fires both SCR's 65 and 79 such that a full sine wave cycle of current is supplied to the motor. The positive half cycle accelerates the capstan, and the negative half cycle then decelerates it. It may be noted that the analyzed expression for $i(t)$ contains an exponential term which represents losses in the electrical circuit of FIG. 2. The waveforms for a full sine wave of current are shown in FIG. 9. It may also be noted that brush friction opposes acceleration and aids deceleration. Thus, these factors may be used to counteract one another by choosing circuit values to give zero velocity at the end of the cycle to insure that the capstan comes to rest. The analytical expression for this relationship is:

$$K_t\int_0^{\frac{1}{\omega}} i(t)\,dt = T_f\int_0^{\frac{1}{\omega}} dt$$

where:

$\omega$=resonant frequency of drive circuit
$K_t$=torque constant of motor
$T_f$=motor frictional torque Because of the inherent consistency of this system in an open loop operation, no servo system is required to insure accuracy of increment distance.

While there have been described above and illustrated in the drawings various forms of control system and magnetic tape transports in accordance with the invention, it will be appreciated that the invention is not limited thereto, but includes all modifications, variations and alternative forms falling within the scope of the appended claims.

What is claimed is:

1. A digital magnetic tape transport comprising supply and take-up reel means and a tape positioned therebetween, a drive capstan in constant non-sliding engagement with the tape, a bidirectional drive motor directly coupled to the capstan, and circuit means for selectively energizing the drive motor, the circuit means including means for providing selected energizing signal characteristics during acceleration and deceleration.

2. A tape transport system comprising a tape, a drive capstan in constant engagement with the tape, means disposed adjacent the drive capstan for maintaining the tape in looped, balanced tension relationship to the capstan, motive means coupled to the capstan, and circuit means responsive to directional control signals for the tape member for energizing the motive means with selected start and stop current waveforms, such that acceleration and deceleration of the tape are controlled solely by the circuit means.

3. A magnetic tape transport system comprising a magnetic tape, a drive capstan in constant non-sliding engagement with the tape, means symmetrically positioned on both sides of the capstan for maintaining the tape in looped, balanced tension relationship to the capstan, a D.C. drive motor coupled directly to the capstan, servo means responsive to the speed of the motor and including amplifier means coupled to maintain the motor speed substantially at a selected velocity in either direction of movement, and means responsive to applied start and stop signals for selected directions of movement for energizing the motor with selected current waveforms to start and stop the tape in controlled fashion.

4. Means for intermittently controlling a web member comprising a drive element in constant, non-sliding frictional engagement with the web member, electrically powered means coupled to the drive element and having a selected acceleration versus current characteristic, and means for applying selected current waveforms to the electrically powered means.

5. Means for moving a web member in bidirectional intermittent operation comprising a drive capstan having a frictional surface in constant engagement with the web member, low friction means disposed adjacent the drive capstan for maintaining the web member in looped balanced tension about the capstan, electrically powered means coupled to the drive capstan including a motor having a selected torque versus current characteristic, and means for energizing the motor with selected current waveforms, the last mentioned means applying the selected current waveforms at start and stop transitions in the control of the web member, whereby selected start and stop characteristics are obtained in the movement of the web member.

6. A tape transport system for digital applications comprising supply and take-up means for the tape, a capstan continuously engaging the tape in non-sliding relationship, a motor having a high torque to inertia ratio and being directly coupled to the capstan, and circuit means for driving the motor bidirectionally with controlled start and stop characteristics.

7. A tape transport system for digital applications comprising supply and take-up means for the tape, a capstan continuously engaging the tape, a motor directly coupled to the capstan, the motor having an acceleration characteristic which is proportional to the driving current, and current control means for operating the motor bidirectionally, the current control means providing selected current waveforms during acceleration and deceleration intervals.

8. The invention as set forth in claim 7 above, wherein the tape is coupled about the capstan with a relatively large wraparound angle, and including means for providing a low friction, low tension path for the tape in the vicinity of the capstan.

9. A system for controlling the operation of a bidirectional drive motor in intermittent fashion but with predictable acceleration and deceleration characteristics comprising means coupled to the drive motor for maintaining the drive motor at individual selected velocities, actuable current pulse generating means coupled to energize the motor, the pulse generating means providing pulses of selected duration, waveform and polarity and control means responsive to commands and coupled to actuate the pulse generating means to provide selected current pulses.

10. A system for controlling the operation of a bidirectional drive motor in intermittent fashion but with predictable acceleration and deceleration characteristics comprising means coupled to the drive motor for sensing the speed thereof servo means coupled to the sensing means for maintaining the drive motor at a selected constant velocity pulse generating means coupled to energize the motor, the pulse generating means providing pulses of selected duration, waveform and polarity and control means responsive to intermittent commands and coupled to energize the pulse generating means to provide selected pulses, and further coupled to control enabling of the servo means.

11. A system for controlling the motion of the capstan of a single capstan digital magnetic tape transport during operation, comprising:

a D.C. connected directly to the capstan, means coupled to the motor for sensing the speed thereof;

servo means, including amplifier means, coupled to the speed sensing means to maintain the motor at selected nominal velocities;

control means operated in response to desired start and stop events to generate acceleration, deceleration and direction signals;

pulse generator means responsive to the acceleration, deceleration and direction signals from the control means for generating current pulses of selected waveform, amplitude and polarity, the current pulses being coupled to control the motor.

12. A system for controlling the acceleration, deceleration and steady state motion of the capstan of a single capstan digital magnetic tape transport in response to applied direction and actuation signals, comprising:

a D.C. motor connected directly to the capstan, the motor having an increasing torque relative to energizing current over a relatively wide range of currents;

means coupled to the motor for sensing the speed thereof;

servo means, including amplifier means, coupled to the speed sensing means and to the motor to control the motor at selected nominal velocities thereof;

control means responsive to the applied direction and actuation signals to generate acceleration, deceleration, direction and steady state control signals;

pulse generator means responsive to the acceleration, deceleration and direction signals from the control means for generating current pulses of selected waveform, amplitude and polarity, the current pulses being coupled to control the motor;

and means responsive to the direction and steady state control signals and coupled to the servo means for enabling the servo means for steady state operation.

13. A system for generating acceleration and deceleration pulses for a drive motor which is operable in intermittent fashion in either of two directions in response to direction and actuation signals, comprising:

a pair of pulse generators, each responsive to an applied control signal for generating a pulse of a selected and different polarity;

a motor coupled to be actuated by the pulse generators;

gating means responsive to the direction and actuation signals for applying control signals representative of acceleration and deceleration commands to the pair of pulse generators;

and interlock means responsive to the control signals and coupled to block operation of the gating means for a selected interval after initiation of an individual pulse from one of the pulse generators.

14. The invention as set forth in claim 13 above, and including in addition servo means responsive to the control signals for maintaining the motor at a substantially constant selected velocity, and constant current means responsive to the control signals and providing a substantial majority of the total energizing signal required to energize the motor to maintain the selected velocity.

15. A drive system for controlling the starting, stopping and bidirectional operation of a capstan drive mechanism for a magnetic tape transport comprising:

a drive capstan in continuous engagement with the tape;

a drive motor having a substantially linear torque-to-current characteristic over a selected range, the drive motor being coupled directly to the drive capstan;

actuable servo means, the servo means including tachometer means, servo amplifier means and drive amplifier means being coupled to control the drive motor;

actuable constant current means coupled to the drive motor means;

gating circuit means responsive to input signal commands for generating at least a pair of control signals, a first of which represents acceleration in a first direction and deceleration in a second direction, and the second of which represents acceleration in the second direction and deceleration in the first direction;

a pair of current pulse generators, each coupled to receive a different one of the control signals and to apply an energizing current pulse of a selected duration and waveform and different polarity to the drive motor;

interlock means, including first delay means, coupled to receive the control signals and controlling the gating circuit means, to disable the gating circuit means for a selected interval following initiation of a control signal;

means, including second delay means, responsive to the control signals for actuating the servo means and the constant current means at the termination of acceleration in either direction;

means responsive to the control signals for de-actuating the servo means and the constant current means at the initiation of deceleration in either direction;

and means, including third delay means, responsive to the control signals for braking the drive motor at the termination of deceleration in either direction.

16. Means for accelerating, decelerating and maintaining constant speed of a drive motor with controlled characteristics comprising a servo system coupled to the drive motor, the servo system including speed sensing means, a servo amplifier and a drive amplifier, the drive amplifier being coupled to the motor, means coupled to the input of the servo system for providing changeable reference signals to the servo amplifier, and means responsive to changes in the reference signals for controlling the acceleration and deceleration characteristics of the motor.

17. A system for operating a drive motor with controlled acceleration, deceleration and constant speed characteristics comprising a servo system coupled to operate the drive motor, the servo system including speed sensing means, servo amplifier means and drive amplifier means, means responsive to changeable input commands for operating the servo means with different reference signals, and a pair of pulse generator means coupled to the servo amplifier means and responsive to changes in the reference signals and coupled to provide energizing pulses to the drive motor, such that the drive motor is substantially separately energized for acceleration and deceleration.

18. A system for operating a drive element in bidirectional and intermittent fashion in response to enabling and direction commands comprising a drive motor having an increasing torque versus current characteristic over a substantial range, the drive motor being coupled to the drive element, drive amplifier means coupled to the motor, servo means, including means for generating a motor speed signal, coupled to the drive amplifier means, input coupling circuit means for enabling the servo means with different reference signals in response to the enabling and direction commands, and means responsive to transitions in signals generated by the servo means for generating energizing pulses, the energizing pulses being coupled to the motor.

19. A system for controlling the operation of an intermittently actuable motor for bidirectional and programmed rotation comprising a drive motor having a torque characteristic which increases with current over a substantial range, drive amplifier means coupled to the motor, tachometer means providing a speed sensing signal coupled to the motor and responsive thereto, servo amplifier means responsive to an input reference signal and speed sensing signal, the servo amplifier means being coupled to operate the drive amplifier means, means for enabling the servo amplifier means in response to off and on commands, means for providing forward and reverse reference signals to the servo amplifier means in response to forward and reverse commands, and means responsive to transition states in the operation of the servo amplifier means for generating energizing pulses, the energizing pulses being coupled to the motor.

20. A system for energizing a drive motor in intermittent, bidirectional fashion in response to forward and reverse commands, comprising:

a drive motor having a torque characteristic which increases with current over a substantial range of currents;

drive amplifier means coupled to the motor;

speed sensing means coupled to the motor and generating a speed signal;

servo amplifier means coupled to receive the speed signal and direction reference signals, the servo amplifier means being coupled to operate the drive amplifier means;

means for providing direction reference signals to the servo amplifier means in response to forward and reverse commands;

a pair of pulse generators, each providing a transition current pulse of a different polarity, and each coupled to the drive motor;

and means coupled to the servo amplifier means and responsive to transition states in the operation thereof for triggering the operation of selected pulse generators.

21. An incremental drive system for a digital data recording and reproducing system using a web member comprising a single drive capstan in constant engagement with the web member, means maintaining the web member in looped, balanced tension relation about the capstan, drive motor means coupled to the capstan, means providing increment commands, means responsive to the increment commands for energizing the drive motor means for a selected interval to accelerate the web member, means operable in the recording mode to substantially immediately thereafter energize the drive motor means to decelerate the web member, and means operable in the reproducing mode and responsive to reproduced data to energize the drive motor after the reproduction of data to decelerate the web member.

22. A system for recording and reproducing digital data in incremental steps at high density on a magnetic tape comprising data recording and reproducing means, means providing increment command signals for the system, a single capstan tape drive system, means for maintaining the tape in constant engagement with the capstan to be driven by the capstan, motor means for driving the capstan bidirectionally, means responsive to the increment command signals for energizing the motor means with pulses of selected amplitude, polarity and duration, to accelerate the tape over selected standard distances, and means responsive to the mode of system operation for energizing the motor means with deceleration pulses of selected amplitude, polarity and duration at (1) a selected time interval after the initiation of acceleration in the record mode and (2) after the reproduction of a data increment in the reproduce mode.

23. An incremental motion magnetic tape recording and reproducing system including:

a low friction tape transport system, including a drive capstan in constant engagement with the tape;

a drive motor having a high torque-to-armature inertia ratio directly coupled to the drive capstan;

a drive amplifier coupled to energize the drive motor;

servo means, including tachometer means coupled to the drive motor, and connected to the drive amplifier to maintain the drive motor at a selected velocity when accelerated;

control means providing incrementing signals and data signals for recording, the data signals being provided when the tape is stopped;

first pulse generating means coupled to the drive motor, the first pulse generating means being responsive to the successive incrementing signals for providing successive energizing pulses to the drive motor, the first pulse generating means providing pulses of selected amplitude, waveform and duration for accelerating the drive motor through selected standard distances;

second pulse generating means coupled to the drive motor, the second pulse generating means providing pulses of selected amplitude, waveform and duration for decelerating the drive motor to a stationary state;

delay means operable in the record mode and responsive to the incrementing signals for energizing the second pulse generating means;

data reproducing means in operative association with the tape and responsive to the data recorded thereon;

and strobe pulse generating means coupled to the data reproducing means and responsive to each data increment, the strobe pulse generating means being coupled to energize the second pulse generating means in the reproduce mode.

24. An incremental drive system for a web member comprising a drive member engaging the web member in non-sliding relation, a motor coupled to drive the drive member, first pulse generator means coupled to the drive motor for energizing the drive motor with an acceleration pulse, second pulse generator means coupled to the drive motor for energizing the drive motor with a deceleration pulse, and means responsive to the operation of the first pulse generator means for operating the second pulse generator means at a selected time delay thereafter.

25. An incremental drive system for a magnetic tape recorder system comprising:

a single drive capstan;

a pair of tape tensioning means, each positioned on a different side of the capstan, and introducing substantially equal tensions in the tape;

low friction tape guide means confining the tape to a path defining successive loops through the tape tensioning means and about the capstan, the tape being in continuous, non-sliding engagement with the capstan;

a motor having a high torque to armature inertia ratio;

and means responsive to increment commands for generating individual full sine wave cycle current pulses, the current pulses being applied to energize the motor.

26. An incremental drive system for a digital data recording system utilizing magnetic tape and operating in response to increment commands, the system providing data signals and increment commands and comprising a pair of tape tensioning means, each positioned on a different side of the capstan, the tape tensioning means introducing substantially like tensions in the tape, such that the tape is maintained in a balanced tension relation relative to the capstan, low friction tape guide means confining the tape to a path defining successive loops through the tape tensioning means and about the capstan, the tape being in continuous, non-sliding engagement with the capstan, a motor having a high torque-to-armature inertia ratio, and a substantially linear torque-to-current ratio over a selected range, and pulse generator means responsive to successive increment commands for generating full sine wave cycle energizing current pulses, the current pulses being applied to the motor, the pulse generator means including means for decreasing the amplitude of the second half cycle of the sine wave such that mechanical losses combine with the energizing pulses to stop the motor substantially precisely at the end of the full cycle.

27. A step by step drive system for enabling incremental reading of successive frames of data on a web member comprising single drive capstan means in constant non-sliding engagement with the web member, means associated with the web member for reproducing the individual data frames from the member, motive means coupled directly to the capstan, the motive means having a known acceleration characteristic for an applied energizing signal, pulse means coupled to the motive means, the pulse means accelerating the motive means over a variable incremental distance related to the position of a data frame on the web member, and pulse means responsive to the reproduction of a data frame for energizing the motive means with a deceleration pulse.

28. An incremental drive system for reading individual frames of digital data recorded on magnetic tape in a standard format comprising:

single capstan drive means;

means maintaining the tape in looped, balanced tension relation about the capstan drive means;

drive motor means coupled directly to the capstan drive means, the drive motor means having a linear torque-to-current characteristic for a substantial range;

means responsive to data on the tape for providing pulses denoting successive frames of data;

and circuit means coupled to provide an acceleration pulse to the drive motor means for each desired increment of movement, and a deceleration pulse to the drive motor means for each data frame pulse.

29. An incremental drive system for reading individual frames of digital data recorded on magnetic tape in a standard digital format comprising a single drive capstan, a pair of tape tensioning means, each positioned on a different side of the capstan, and introducing substantially equal tensions in the tape, such that the tape is maintained in a looped, balanced tension relation about the capstan, drive motor means coupled directly to the capstan, the drive motor means having an increasing torque-to-current characteristic for a substantial range of current values, means responsive to the data recorded in a frame on the tape for providing a strobe pulse denoting the individual frame, speed control means responsive to the speed of the motor and maintaining the motor at a selected velocity after acceleration, motor acceleration control means including pulse generator means responsive to increment commands for energizing the motor with an input pulse to provide a selected velocity of tape movement, and pulse generator means responsive to the strobe pulses for energizing the motor with a deceleration pulse following the strobe pulse for a frame, the deceleration pulse being of selected amplitude, duration and waveform to bring the motor and the tape to a stop.

References Cited by the Examiner

UNITED STATES PATENTS

| | | | |
|---|---|---|---|
| 2,866,143 | 12/58 | Maxwell | 318—314 X |
| 2,922,095 | 1/60 | Hesse et al. | 318—341 X |
| 2,932,778 | 4/60 | Curtis | 318—314 |
| 2,968,451 | 1/61 | Schneider | 242—75.51 |
| 2,975,991 | 3/61 | Michel | 242—75.51 |
| 2,989,260 | 6/61 | Panissidi | 242—75.12 |
| 2,990,484 | 6/61 | Jones | 242—75.51 |
| 3,018,978 | 1/62 | Graneau et al. | 242—75.51 |
| 3,050,594 | 8/62 | Bick et al. | 226—42 X |
| 3,087,663 | 4/63 | Anderson | 226—42 |
| 3,105,179 | 9/63 | Young | 242—75.51 X |
| 3,109,131 | 10/63 | Byrd | 318—341 X |
| 3,112,052 | 11/63 | Johnson | 226—42 |
| 3,112,473 | 11/63 | Wicklund | 340—174.1 |
| 3,122,332 | 2/64 | Hughes | 226—118 X |

ROBERT B. REEVES, *Acting Primary Examiner.*

RAPHAEL M. LUPO, WILLIAM B. LA BORDE, SAMUEL F. COLEMAN, *Examiners.*

Notice of Adverse Decision in Interference

In Interference No. 95,903 involving Patent No. 3,185,364, R. A. Kleist, DRIVE SYSTEM FOR TAPE TRANSPORT SYSTEM, final judgment adverse to the patentee was rendered Mar. 12, 1970, as to claims 1, 4, 9 and 27.

[*Official Gazette June 2, 1970.*]

UNITED STATES PATENT AND TRADEMARK OFFICE

CERTIFICATE OF CORRECTION

PATENT NO. : 3,185,364

DATED : May 5, 1965

INVENTOR(S) : Robert A. Kleist

It is certified that error appears in the above-identified patent and that said Letters Patent are hereby corrected as shown below:

Col. 7, line 68, between "108" and "109", delete the comma (",") and substitute --or--; line 69, between "112" and "deactivate", "a" should read --to--. Col. 12, claim 11, line 10, between "D.C." and "connected" insert --motor--. Col. 13, claim 15, line 6, between "means" and "being coupled" insert --and--.

Signed and Sealed this

Fifth Day of October 1976

[SEAL]

*Attest:*

RUTH C. MASON
*Attesting Officer*

C. MARSHALL DANN
*Commissioner of Patents and Trademarks*